United States Patent [19]
Chun

[11] Patent Number: 5,421,606
[45] Date of Patent: Jun. 6, 1995

[54] STEERABLE FRONT WHEEL SUSPENSION FOR VEHICLE

[75] Inventor: Dongee Chun, Ulsan, Rep. of Korea

[73] Assignee: Hyundai Motor Company, Seoul, Rep. of Korea

[21] Appl. No.: 165,592

[22] Filed: Dec. 13, 1993

[30] Foreign Application Priority Data

Dec. 14, 1992 [KR] Rep. of Korea ............... 92-24234

[51] Int. Cl.⁶ ............................................... B60G 3/00
[52] U.S. Cl. ...................................... 280/691; 280/660; 280/673; 280/675; 280/696
[58] Field of Search ............... 280/691, 690, 688, 660, 280/673, 675, 692, 696, 693

[56] References Cited

U.S. PATENT DOCUMENTS

| | | | |
|---|---|---|---|
| 3,229,783 | 1/1966 | Müller | 280/690 |
| 3,942,816 | 3/1976 | Scherenberg et al. | 280/673 |
| 4,556,238 | 12/1985 | Matschinsky | 280/673 |
| 4,671,532 | 6/1987 | Matschinsky et al. | 280/675 |
| 4,875,703 | 10/1989 | Murakami | 280/696 |
| 4,878,688 | 11/1989 | Kubo | 280/693 |
| 4,941,677 | 7/1990 | Matsumoto et al. | 280/696 |
| 5,009,449 | 4/1991 | Edahiro et al. | 280/690 |
| 5,026,090 | 6/1991 | Sekino | 280/675 X |
| 5,249,817 | 10/1993 | Bruhl | 280/673 X |
| 5,292,149 | 3/1994 | Luger | 280/673 X |

FOREIGN PATENT DOCUMENTS

| | | | |
|---|---|---|---|
| 0144207 | 1/1990 | Japan | 280/692 |
| 2249712 | 10/1990 | Japan | 280/673 |

Primary Examiner—Margaret A. Focarino
Assistant Examiner—Christopher Ellis

[57] ABSTRACT

A steerable front wheel suspension for a vehicle includes a steering knuckle pivotally supporting a wheel, a connecting arm perpendicularly upright from the knuckle and having upper ends diverging in a Y-shape, a first upper control arm and a second upper control arm connected respectively to the upper ends of the connecting arm and horizontally linked to a car body, lower control arms disposed in a horizontal direction with respect to the car body and connecting the lower part of the steering knuckle to the car body, a tie rod connected to a steering gear box to connect the steering knuckle to the car body and a strut assembly formed of a shock absorber and a spring, its upper part being supported by an insulator supporting part to the car body and its lower part being connected to the lower arm.

14 Claims, 5 Drawing Sheets

STEERABLE FRONT WHEEL SUSPENSION FOR VEHICLE

BACKGROUND OF THE INVENTION

1. Field of the Invention

The present invention relates to a steerable front wheel suspension for a vehicle and, more particularly, to a steerable front wheel suspension for a vehicle which can enhance riding comfort and handling safety by providing a nominal kingpin, simultaneously with providing long upper control arms.

2. Description of Related Art

A suspension for vehicle connects an axle shaft and a car body to each other, and controls a position of a tire with respect to the car body for its optimal position during running of the vehicle. Thus, optimal handling safety may be obtained, and the axle shaft is prevented from directly transmitting impact or vibration from a road surface to the car body. The suspension also prevents damage of baggage, thereby improving riding comfort.

Particularly, in a steerable front wheel suspension, the suspension should be designed to absorb vibration or impact from the road surface as well as obtain running safety by maintaining an optimal position of a vehicle's straight ahead position and handling safety of a vehicle's turning position.

The suspension system is structurally characterized as an integral shaft suspension and an independent suspension. The suspension of the present invention concerns an independent suspension, and the independent suspension includes several kinds of suspension systems. There are McPherson strut type and Wishbone type suspension systems used in the front wheels.

The front wheel is mounted to change its direction from right to left or from left to right, centering on the kingpin, and is also mounted with a geometric angle so as to meet the requisite for the front wheel suspension.

Mounting the front wheel with the geometric angle is called a front wheel alignment. The front wheel alignment is distinguished by several elements, but the optimal operation of the front wheel is, however, achieved by the supplemental operation of the elements with respect to each other. A kingpin inclination among the elements reduces a handling force of a steering wheel with a camber, absorbs an impact generated when the vehicle is running and being braked, and then increases a restitution force of a steering wheel, thereby obtaining running safety in a vehicle's straight ahead position and handling safety in a vehicle's turning position.

The kingpin is mounted at an inclination such that its central line lies at a predetermined angle with respect to the vertical line when the vehicle is viewed from the front. An interval between the central line of the kingpin and a center line of the wheel is called offset. The offset is generally characterized as an offset at the wheel center and an offset at the ground. The offset at the wheel center has an effect on the vehicle's straight ahead characteristics when either the driving force or the engine brake is applied to the wheels. The offset at the ground adversely affects the handling safety when the vehicle is braked and turning. If the offset at the ground is decreased, the sensitivity with respect to the steering is decreased, such that the handling safety is increased when the vehicle is cornering and being braked.

Further, steering stability of the vehicle is closely related to the vibration of the car body. During the vehicle's running, rolling, pitching, and yawing occurs in addition to bounce. These vibrations should be absorbed to increase the stability and the ride comfort.

In such vibrations, the rolling occurs at a predetermined point when the vehicle is in a turning situation, and this point is called a roll center. The variation rate of the roll center's height has an effect on the running safety and steering stability of the vehicle. Accordingly, to achieve running safety, it is more desirable to decrease the variation rate of the roll center's height.

FIG. 6 is a front view of conventional Wishbone type (strut assembly type) suspension, wherein the suspension includes upper and lower control arms 2, 4; a steering knuckle 6; a strut assembly 8 having a shock absorber 81 and a spring; and ball joints 21, 41 of the upper and lower control arms 2, 4. A kingpin offset a may be reduced by moving a car body-side connecting portion 22 of the upper control arm 2 to the engine room and moving the ball joints 41 of the lower control arm 4 to the outside, even though this suspension has an advantage in its simple structure and weight. To reduce the kingpin offset $\alpha$ or attain a negative (−) state, when the connecting point 22 of the upper control arm 2 is moved to the engine room, the available volume of the engine room is to be reduced simultaneously with increasing the kingpin offset $\alpha$. The cornering performance of the vehicle may be adversely affected thereby. And also, it is impossible to move the ball joint 41 of the lower control arm 4 outwardly because of interference with a disk brake. Therefore, this suspension has problems in reducing the kingpin offset $\alpha$.

Further, if the length of the upper control arm is shortened, the kingpin offset may be almost zero, with an increased bushing effect and change in the camber angle. On the contrary, if the length of the upper control arm becomes long, the bushing effect can be decreased but the change in the camber angle and kingpin offset cannot he reduced to zero.

That is, the conventional suspension system cannot solve the combined problems of the kingpin offset, steering angle, and bushing effect at the same time.

SUMMARY OF THE INVENTION

Accordingly, the present invention is created in order to solve the problems as mentioned above.

It is an object of the present invention to provide a steerable front wheel suspension which can enhance safety in a vehicle's straight ahead position and ride comfort by making the kingpin offset to be zero or attain a negative value (−) and reducing the bushing effect and changes in the camber angle.

It is another object of the present invention to provide a steerable front wheel suspension which can variously change an imaginary instantaneous center of the upper control arm and enhance the freedom of setting the kingpin offset.

It is still another object of the present invention to provide a steerable front wheel suspension which can improve handling safety and decrease impact, by inducing a toe-in state of a position of a tire bearing front and rear loads produced by braking of the tire or impact.

To achieve the above objects, the present invention provides a front wheel suspension for a vehicle comprising: a steering knuckle pivotally supporting a wheel; a connecting arm extending upright from and perpendicular to the knuckle and having upper ends diverging in a Y-shape; a first upper control arm and a second upper control arm connected respectively to the upper ends of the connecting arm and horizontally linked to a car body; a lower control arms disposed in a horizontal direction with respect to the car body and connecting the lower part of the steering knuckle to the car body; a tie rod connected with a steering gear box (not shown) to connect the knuckle to the car body and a strut assembly formed of a shock absorber and a spring, its upper part being supported by an insulator supporting part to the car body and its lower part being connected to the lower arm.

In the steerable front wheel suspension, the first upper control arm and the second upper control arm are disposed to cross each other. The upper ends of the connecting arm have a Y-shape and are formed to be different from each other in height.

The steerable front wheel suspension of this invention provides at least one of the first and second upper control arms with a curved crossing point. The first and second upper control arms are each connected to the Y-shaped upper ends of the connecting arm by a ball joint.

Each car body side connecting portion of the first and second upper arms is connected with both sides of a connecting means having a bushing. Each wheel side connecting portion of the forward and rear lower control arms is connected by means of a ball joint.

In addition, each car body side connecting portion of the forward and rear lower control arms is connected with both sides of a connecting means having a bushing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitative of the present invention, and wherein.

DETAILED DESCRIPTION OF PREFERRED EMBODIMENTS

Figure 1:
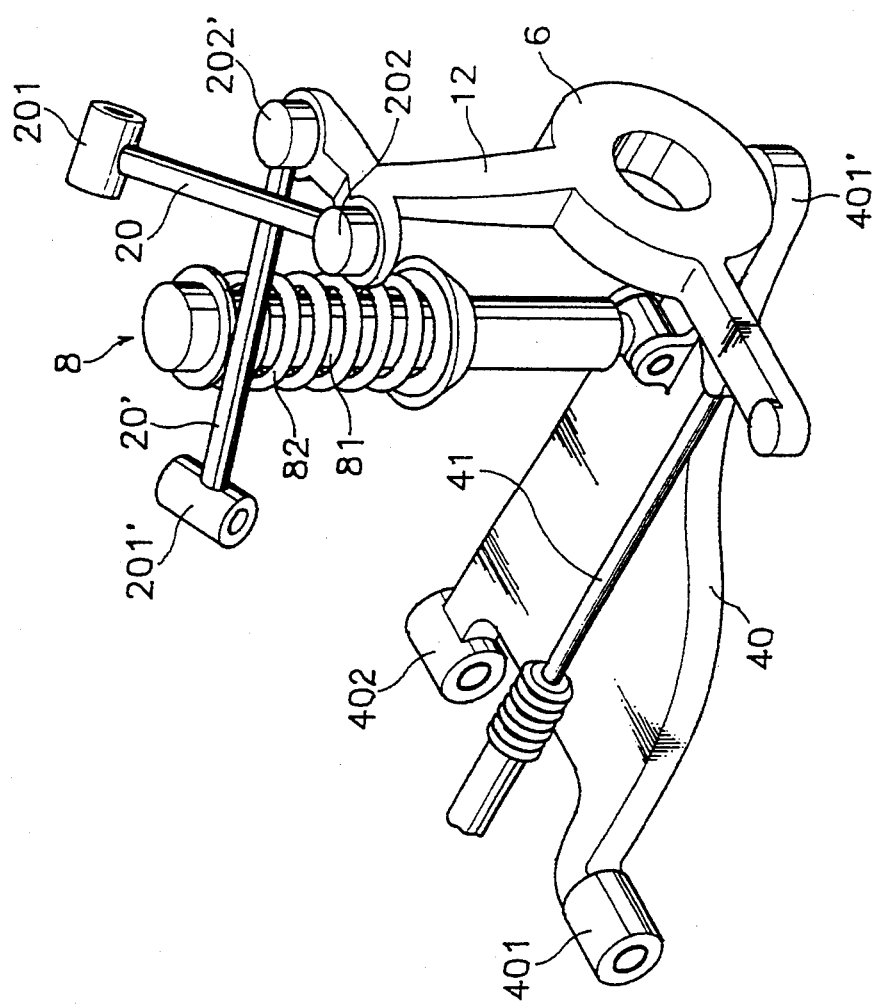
FIG. 1 is a perspective view of a front wheel suspension in accordance with the present invention.
Figure 2:
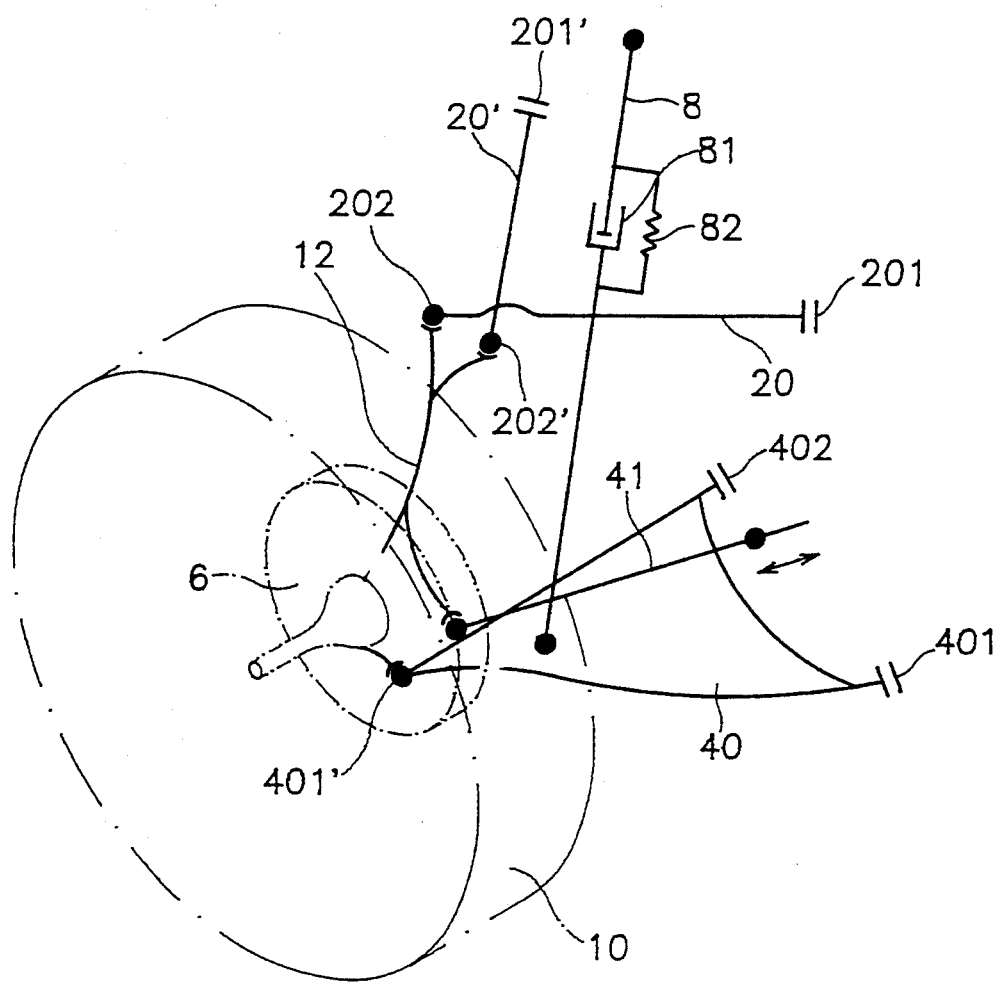
FIG. 2 is a schematic perspective view of the front wheel suspension in accordance with the present invention.
Figure 3:
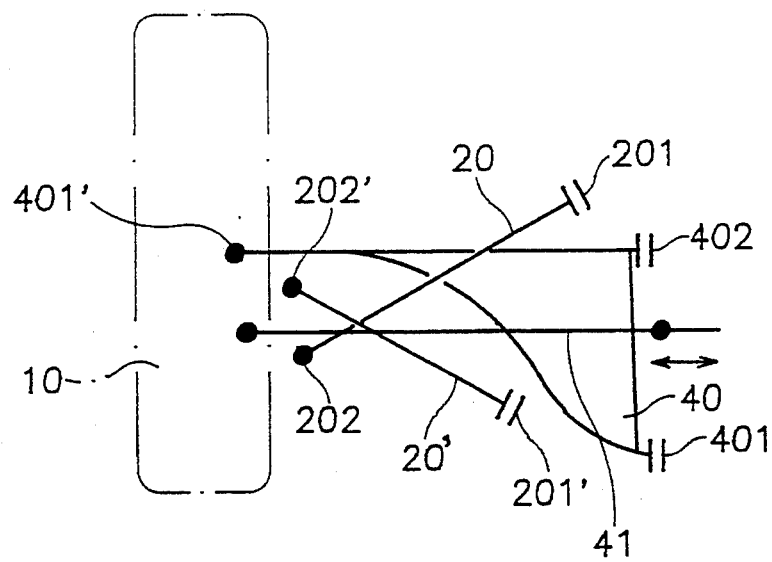
FIG. 3 is a schematic plan view of the front wheel suspension in accordance with the present invention.

FIGS. 1, 2, 3 and 4 are respectively perspective views, a plan view and a front view in accordance with the first embodiment of a front wheel suspension of the present invention.

The suspension of the present invention includes a steering knuckle 6 pivotally supporting a wheel 10; a connecting arm 12 connected to the upper part of the steering knuckle 6; first and second upper control arms 20, 20' connecting the upper and lower parts of the connecting arm 12 and the lower part of the steering knuckle 6 to a car body (not illustrated) to enable the steering knuckle 6 including the wheel 10 to move upwardly and downwardly with respect to the car body; and lower control arm 40.

The connecting arm 12 connected to the upper part of the steering knuckle 6 diverges in a letter "Y" and one part is formed to be higher than the other part. The higher part is connected with the first upper control arm 20, and the lower part is connected with the second upper control arm 20'.

In other words, the upper control arms that connect the upper part of the connecting arm 12 to the car body are disposed upward and downward with respect to the car body to cross each other. On respective ends of the upper control arms, connecting portions 201, 201' are formed to be pivotally connected to the car body by inserting a rubber bush therein. Wheel-side connecting portions 202, 202' are pivotally connected to the connecting arms 12 by a ball joint.

The lower control arm 40 connects the lower part of the steering knuckle 6 to the car body. Connecting portions 401, 401' are formed on a car body side end of the lower control arms 40. The car body-side connecting portions 401, 402 are each pivotally connected to a bracket of the car body by means of a rubber bush. The wheel-side connecting portion 401' is connected to the lower part of the steering knuckle 6.

The above rubber bush and ball joint are the same as those used in the conventional suspension, and they enable the wheel 10 including the steering knuckle 6 to move upwardly and downwardly with respect to the car body.

A strut assembly 8 includes a shock absorber 81 and a spring 82, and its upper part is supported by the car body, and its lower part is pivotally connected to the lower control arms 40 to absorb and offset the impact generated upwardly and downwardly with respect to the car body.

A tie rod 41 connected with a steering gear box (not shown) connects the knuckle 6 to the car body.

Figure 4:
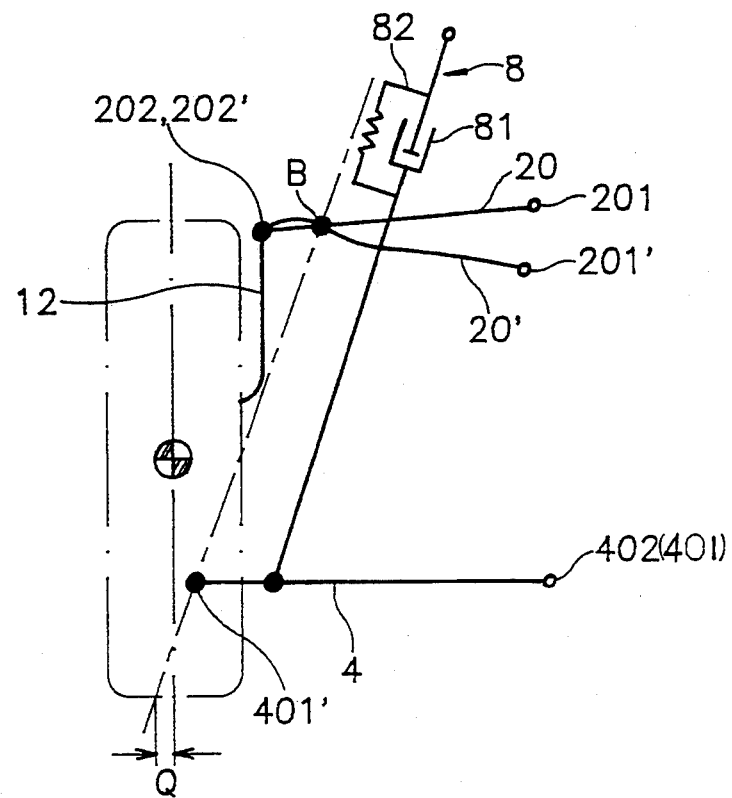
FIG. 4 is a schematic rear view of the front wheel suspension in accordance with the present invention.
Figure 5:
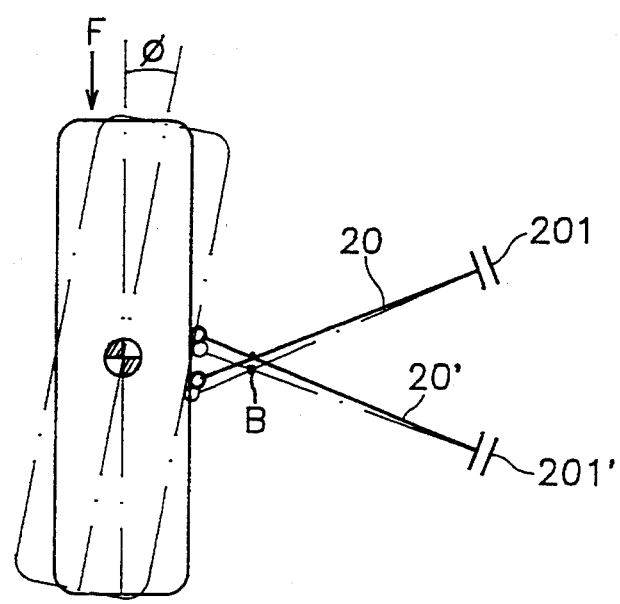
FIG. 5 is a schematic plan view in a position of a tire by brake and impact in the front wheel suspension in accordance with the present invention.
Figure 6:
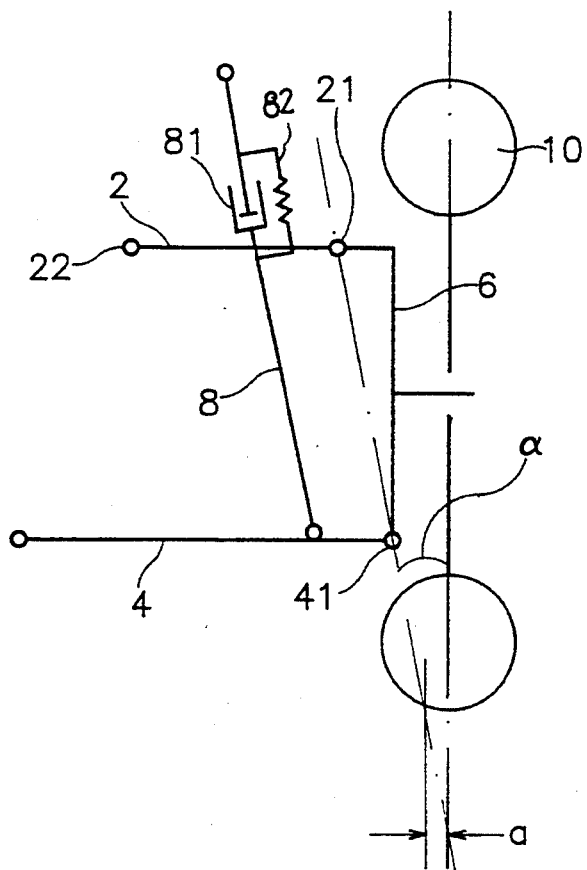
FIG. 6 depicts the construction of a conventional front wheel suspension.

Referring now to FIGS. 4 and 5, the functions and effects of the present invention are described.

During the steering of the wheel, an imaginary instantaneous center of the connecting arm to the first upper control arm 20 and second upper control arm 20' is formed on a point B where the two upper control arms cross each other, and an instantaneous center with respect to the lower control arm 40 is formed on the wheel-side connection portion 401'.

Accordingly, the kingpin shaft is shown as dot-dash lines of FIG. 4 to which the point B is connected.

That is, the upper control arms 20, 20' connecting the wheel to the car body are connected to the connecting arm 12, and cross each other, with each up-and-down space being of a predetermined width, centering on the two hinge points 202, 202'. This crossing point becomes the imaginary instantaneous center.

Accordingly, this result is similar to that achieved by moving the upper control arms to the engine room, and a kingpin offset Q is reduced to zero or attains a negative value (−). It causes reduction in sensitivity to steering, and the handling safety may be enhanced at the time of braking and/or rotating the car.

In addition, the bushing effect can be reduced by setting the upper control arms to be long, and ride comfort can be increased by minimizing the changes in the camber angle and the tread angle that occur by the up-and-down movement of a tire.

As shown in FIG. 5, the upper control arms 20, 20' that cross each other with each up-and-down space being of a predetermined width are formed. When the braking force F and impact are applied to a contact patch of the tire, loads are applied respectively to around the mounting portion of the lower control arms and that of the upper control arms. The load around the mounting portion of the lower control arms tends to move the upper control arms forward, and braking safety and steering stability can be achieved by the toe-in effect of the tire by double links.

Although preferred embodiments of the present invention have been described in detail hereinabove, it should be clearly understood that many variations and/or modification of the basic inventive concepts herein taught which may appear to those skilled in the pertinent art will still fall within the spirit and scope of the present invention, as defined in the appended claims.

What is claimed is:

1. A steerable front wheel suspension for a vehicle comprising:
   a steering knuckle pivotally supporting a wheel;
   a connecting arm perpendicularly upright from said knuckle and having upper ends diverging in a Y-shape;
   a first upper control arm and a second upper control arm connected respectively to the upper ends of said connecting arm and horizontally linked to a car body, wherein said first upper control arm and said second upper control arm are disposed to cross each other;
   a single lower control arm disposed in a horizontal direction with respect to the car body wherein said lower arm has two connecting points with the car body for connecting the lower part of said steering knuckle to the car body;
   a tie rod for connecting the steering knuckle to the car body; and
   a strut assembly formed of a shock absorber and a spring, its upper part being supported by an insulator support part to the car body and its lower part being connected to said lower arm by a bushing.

2. The steerable front wheel suspension according to claim 1, wherein the upper ends of said connecting arm are formed to be different from each other in height.

3. The steerable front wheel suspension according to claim 1, wherein at least one of said first and second upper control arms has a curved crossing point.

4. The steerable front wheel suspension according to claim 1, wherein said first and second upper control arms are each connected to the Y-shaped upper ends of the connecting arms by a ball joint.

5. The steerable front wheel suspension according to claim 1, wherein each car body side connecting portion of said first and second upper arms is connected with both sides of a connecting member having a bushing.

6. The steerable front wheel suspension according to claim 1, wherein each wheel-side connecting portion of said forward and rear lower control arms includes a connecting ball joint.

7. The steerable front wheel suspension according to claim 1, wherein each car body-side connecting portion of said forward and rear lower control arms is connected with both sides of a connecting member having a bushing.

8. A steerable front wheel suspension for a vehicle comprising:
   a steering knuckle pivotally supporting a wheel;
   a connecting arm perpendicularly upright from said knuckle and having upper ends diverging in a Y-shape;
   a first upper control arm and a second upper control arm connected respectively to the upper ends of said connecting arm and horizontally linked to a car body, said first upper control arm and said second upper control arm being disposed to cross each other;
   a lower control arm disposed in a horizontal direction with respect to the car body and connecting the lower part of said steering knuckle to the car body;
   a tie rod for connecting the steering knuckle to the car body; and
   a strut assembly formed of a shock absorber and a spring, its upper part being supported by an insulator supporting part to the car body and its lower part being connected to said lower arm by a bushing.

9. The steerable front wheel suspension according to claim 8, wherein the upper ends of said connecting arm are formed to be different from each other in height.

10. The steerable front wheel suspension according to claim 8, wherein at least one of said first and second upper control arms has a curved crossing point.

11. The steerable front wheel suspension according to claim 8, wherein said first and second upper control arms are each connected to the Y-shaped upper ends of the connecting arms by a ball joint.

12. The steerable front wheel suspension according to claim 8, wherein each car body side connecting portion of said first and second upper arms is connected with both sides of a connecting member having a bushing.

13. The steerable front wheel suspension according to claim 8, wherein each wheel-side connecting portion of said forward and rear lower control arms includes a connecting ball joint.

14. The steerable front wheel suspension according to claim 8, wherein each car body-side connecting portion of said forward and rear lower control arms is connected with both sides of a connecting member having a bushing.

* * * * *